United States Patent [19]
Chen

[11] Patent Number: 5,102,598
[45] Date of Patent: Apr. 7, 1992

[54] METHOD OF MAKING A TEXTURED VENETIAN BLIND

[75] Inventor: Chang-Than Chen, Kaohsiung, Taiwan

[73] Assignee: Gilmore Enterprises Window Coverings, Inc., Sylmar, Calif.

[21] Appl. No.: 632,810

[22] Filed: Dec. 24, 1990

[51] Int. Cl.$^5$ .................. B29B 11/16; B29C 67/16
[52] U.S. Cl. .................... 264/140; 264/148; 264/177.1; 264/177.17; 264/211
[58] Field of Search ........... 264/148, 160, 151, 211, 264/163, 177.17, 177.19, 285, 339, 177.16, 140, 141, 177.1

[56] References Cited
U.S. PATENT DOCUMENTS

| | | | |
|---|---|---|---|
| 4,101,620 | 7/1978 | Kops et al. | 264/177.16 |
| 4,309,472 | 1/1982 | Gotting et al. | 428/224 |
| 4,329,307 | 5/1982 | Westcott et al. | 264/285 |
| 4,711,005 | 12/1987 | Chang | 264/160 |
| 4,789,515 | 12/1988 | Yu | 264/339 |
| 4,792,427 | 12/1988 | Reeves | 264/285 |

Primary Examiner—Jeffery Thurlow
Attorney, Agent, or Firm—John J. Posta, Jr.

[57] ABSTRACT

A polyvinyl chloride venetian blind is provided which has a number of corrugated, translucent slats. The slats have staple fibers in their composition that gives them a sand or granite textured appearance and feel, so that the venetian blind has more natural and aesthetic appeal. The slats are formed by an extrusion process utilizing a mixture of polyvinyl chloride, titanium dioxide, plasticizer, tribasic lead sulfate, stearic acid and dyed staple fibers having a length of less than about 2 mm.

3 Claims, 2 Drawing Sheets

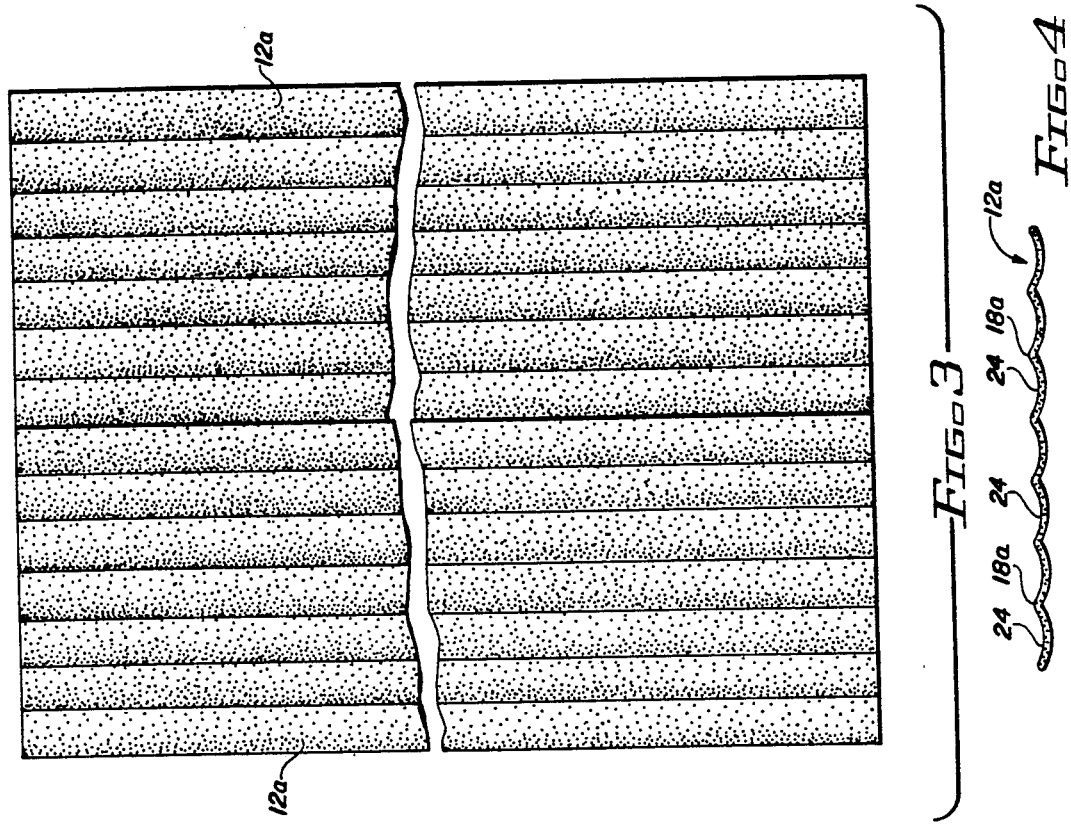
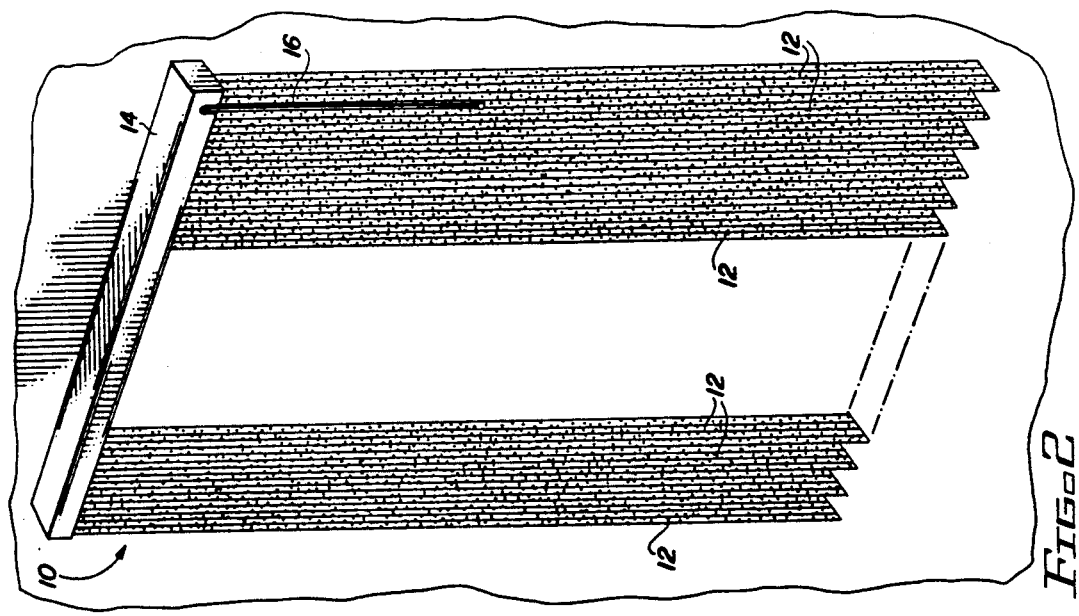

METHOD OF MAKING A TEXTURED VENETIAN BLIND

BACKGROUND OF THE INVENTION

This invention generally relates to a polyvinyl chloride (PVC) venetian blind and more particularly relates to such PVC venetian blind that has slats with a sand or granite textured appearance and feel, and a method of making the same.

Various types of venetian blinds have been developed in the past utilizing many different materials. For example, slats for venetian blinds can be made from linear polyester fibers woven into cloth (U.S. Pat. No. 4,309,472 to Gotting). In recent years the use of PVC as the slat material has become more popular, since PVC is inexpensive and long lasting. However, conventional PVC slats are of a plain color and a smooth texture and therefore have an unnatural appearance and feel.

Therefore, it would be desirable to be able to provide a PVC venetian blind that has slats with a more natural appearance and feel, such as a sand or granite textured uneven surface, appearance and feel. It also would be desirable to be able to provide PVC venetian blind slats which are translucent in order to more effectively display their natural appearance.

SUMMARY OF THE INVENTION

The present invention satisfies all the foregoing needs. The invention is substantially as set forth in the Abstract of the Disclosure. Thus, a venetian blind is formed of a plurality of slats which are corrugated and translucent and are made of PVC. The slats contain appreciable amounts of short 2 mm length or less) staple fibers of cotton, and/or wool and/or flax to give them a desired sand or granite-like feel and appearance. Thus, the slats are of more natural appearance than conventional PVC slats.

In accordance with the present method, the slats are formed from a mixture of PVC, titanium dioxide, plasticizer, tribasic lead sulfate, stearic acid and the chopped staple fibers. The mixture is pelletized and the pellets are heated and passed through an extrusion die to form the slats.

Various other aspects of the invention are set forth in the following detailed description and accompanying drawings.

BRIEF DESCRIPTION OF THE DRAWINGS

FIG. 2 is a schematic perspective view of a first preferred embodiment of the venetian blind of the present invention incorporating a plurality of the slats of FIG. 1;

FIG. 3 is an enlarged fragmentary schematic front elevation of a second preferred embodiment of a pair of slats of the present invention in a closed, side-by-side position;

FIG. 4 is a further enlarged schematic top plan view of one of the slats of FIG. 3; and, FIG. 5 is a schematic perspective view of a third preferred embodiment of the slats of the present invention and a venetian blind incorporating the same.

DETAILED DESCRIPTION

FIGS. 1 & 2

Figure 1:
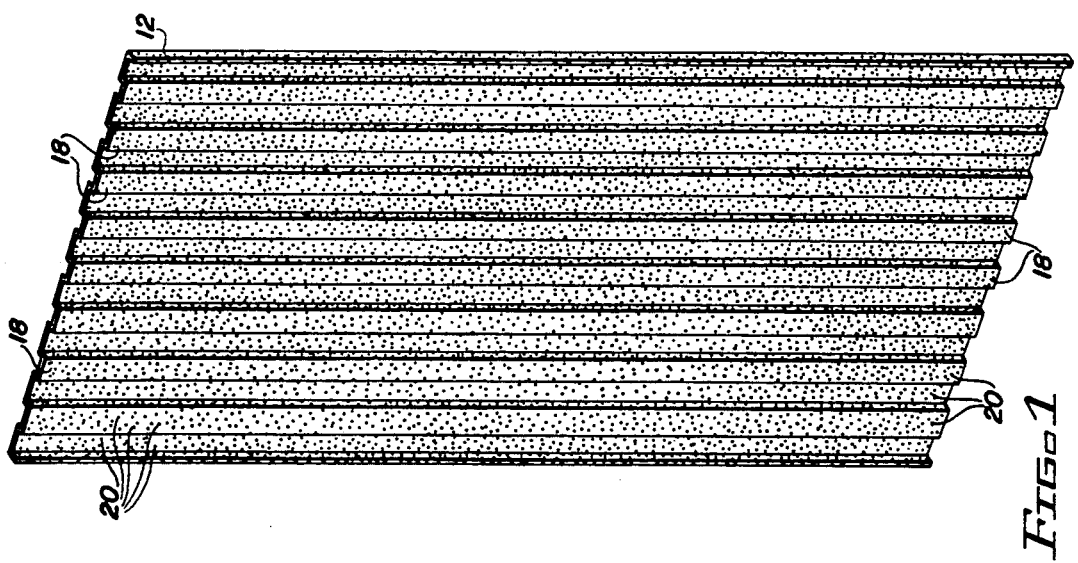
FIG. 1 is an enlarged fragmentary schematic perspective view of a portion of a first preferred embodiment of the venetian blind slat of the present invention.

Now referring more particularly to FIGS. 1 and 2 of the drawings, a first preferred embodiment of the improved venetian blind of the present invention is shown in FIG. 2, incorporating a plurality of slats as shown in FIGS. 1 and 2. Thus, venetian blind 10 is shown which comprises a plurality of parallel slats 12. The arrangement of slats 12 to form blind 10 is conventional prior art and will not be described further, except to say that slats 12 are pivotally connected in the usual manner in a top header 14 of blind 10 and are operable by a cord 16 connected thereto to close and open.

Each slat 12 has a large number of short (about 2 mm. or less in length) staple fibers of cotton and/or wool and/or flax, or other natural fibers therein to provide the appearance and feel of sand or granite; that is, a rough, pebble-like textured material.

Each slat 12 is made in accordance with the present method, as set forth in the following specific example:

EXAMPLE

Polyvinyl chloride, titanium dioxide, conventional polyvinyl chloride plasticizer, tribasic lead sulfate, stearic acid and the staple fibers are mixed together to form the following mixture:

Polyvinyl chloride—about 100 parts by weight
Titanium dioxide—about 4 parts by weight
Plasticizer—about 2 parts by weight
Tribasic lead sulfate—about 1.4 parts by weight
Stearic acid—about 0.2 parts by weight
Staple fibers (mixture—about 1–2 parts by weight cotton, wool & flax) (fibers 2 mm. in length The resulting mixture is pelletized and the resulting pellets are then heated to about 162–171° C., then passed through an extrusion die to form slats 12, which are then cooled and cut to length.

It will be understood that different proportions of the ingredients specified above can be used in the mixture, with more or less staple fiber and that the fiber can be of one or more types. The pellets can be heated to a temperature somewhat outside the range called for above, if desired, and the plasticizer can be any conventional PVC plasticizer such as non-volatile ester, low molecular weight resin or certain types of rubber.

Slats 12 are of a thickness, e.g., 1/32–1/16 inch. thick, such that when venetian blind 10 is closed, blind 10 is translucent, which thereby enhances the natural appearance and aesthetic appeal of blind 10. It will be seen from FIG. 1 that slats 12 are corrugated, with parallel ridges 18 running the length thereof. Staple fibers 20 give a speckled sandy or granite-like natural appearance to slats 12, rather than the artificial plastic appearance of conventional PVC slats. Accordingly, slats 12 and blind 10 are of improved appearance and feel.

FIGS. 3 and 4

A second preferred embodiment of the improved slats of the present invention is schematically depicted in FIG. 3 and 4. Slats 12a are substantially identical to slats 12, except as indicated hereafter. Thus, a pair of slats 12a are shown in blind closed position side-by-side. Slats 12a differ from slats 12 in the shape of the ridges 18a thereof. Thus, slats 12a comprise a plurality; namely, seven, of uniformly carved segments 24, joined in side-by-side relation, rather than the stepped configuration of slats 12. Slats 12a can be fully substituted for slats 12 in venetian blind 10 with similar results.

FIG. 5

Figure 5:
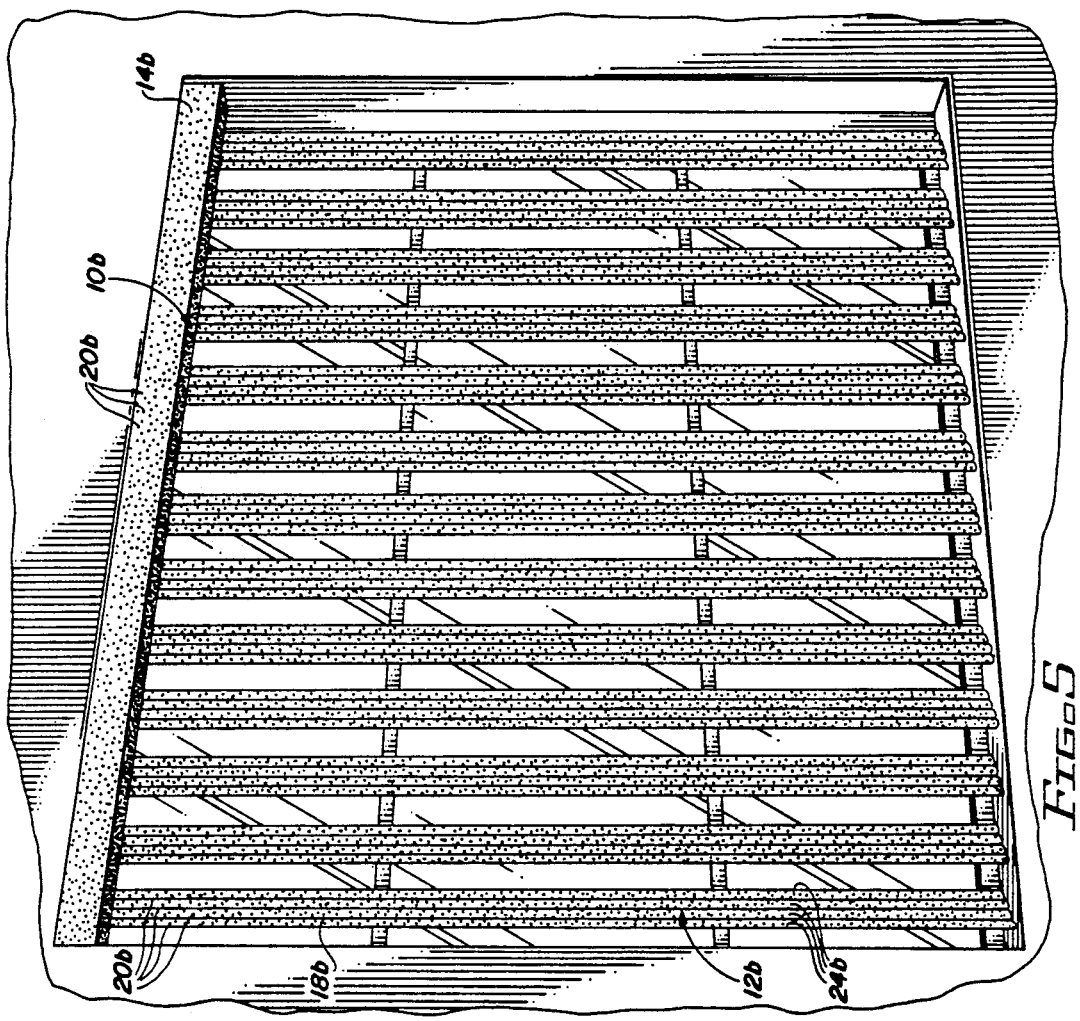

A third preferred embodiment of the slats of the present invention is depicted schematically in FIG. 5 incorporated into a venetian blind of the invention. Thus, blind 10b is shown. Components thereof similar to those of blind 10 bear the same numerals, but are succeeded by the letter "b".

Blind 10b is substantially identical to blind 10 except that slats 12b have the configuration of slats 12a, but segments 24b thereof are only four in number rather than seven Moreover, header 18b bears staple fibers 20b, as do slats 12b. Blind 10b has substantially the advantages of blind 10.

Various modifications, changes, alterations and additions can be made in the improved blind of the present invention, its components and parameters and in the present method, its steps and parameters. All such modifications, changes, alterations and additions as are within the scope of the appended claims form part of the present invention.

What is claimed is:

1. An improved method of making polyvinyl chloride slats for a venetian blind, said method comprising the steps of:
   (a) mixing together polyvinyl chloride, titanium dioxide, polyvinyl chloride, titanium dioxide, polyvinyl chloride plasticizer, tribasic lead sulfate, stearic acid and staple fibers having a length of less than about 2 mm. to form a mixture;
   (b) forming pellets from said mixture;
   (c) heating said pellets to about 162-171° C. and passing them through an extrusion die to form slats; and,
   (d) cooling said formed slats and cutting them to length.

2. The improved method of claim 1 wherein said slats are translucent and for each about 100 parts by weight of polyvinyl chloride in said mixture, said mixture also contains about 4 parts by weight of titanium dioxide, about 2 parts by weight of said plasticizer, about 1.4 parts by weight of said tribasic lead sulfate, about 0.2 parts by weight of said stearic acid and about 1-2 parts by weight of said staple fibers.

3. The improved method of claim 2 wherein said staple fibers are selected from the group consisting of cotton, flax, wool and mixtures thereof.

* * * * *